United States Patent [19]

Coleman

[11] 4,062,117
[45] Dec. 13, 1977

[54] RESCUE TOOL MEANS

[76] Inventor: John D. Coleman, 422 S. Greer St., Memphis, Tenn. 38111

[21] Appl. No.: 727,160

[22] Filed: Sept. 27, 1976

[51] Int. Cl.² ........................................... B26B 3/00
[52] U.S. Cl. ..................................... 30/317; 30/168; 30/294; 30/315
[58] Field of Search ................. 30/317, 314, 315, 277, 30/294, 165, 168, DIG. 3, DIG. 8

[56] References Cited

U.S. PATENT DOCUMENTS

| | | | |
|---|---|---|---|
| 934,585 | 9/1909 | Trafford | 30/DIG. 8 |
| 1,174,348 | 3/1916 | Redman | 30/DIG. 3 |
| 1,875,612 | 9/1932 | Johnson | 30/168 |
| 1,988,386 | 1/1935 | Komperud | 30/314 |
| 2,007,700 | 7/1935 | Ziminski | 30/314 |
| 2,075,302 | 3/1937 | Poe | 30/165 |
| 2,255,196 | 9/1941 | Taylor | 30/168 |
| 2,670,535 | 3/1954 | Ogden | 30/317 |
| 2,764,814 | 10/1956 | Jecker | 30/317 X |
| 3,694,918 | 10/1972 | Bailey et al. | 30/277 |

FOREIGN PATENT DOCUMENTS

| | | | |
|---|---|---|---|
| 27,231 | 2/1921 | Denmark | 30/294 |
| 588,195 | 5/1947 | United Kingdom | 30/289 |

Primary Examiner—Al Lawrence Smith
Assistant Examiner—J. T. Zatarga
Attorney, Agent, or Firm—John R. Walker, III

[57] ABSTRACT

A relatively small, pocketable rescue tool for cutting and/or breaking various substances in order to free trapped victims from automobiles and the like. The tool includes first and second members integrally joined together by a throat member with the first and second members extending in substantially the same direction and being substantially parallel with one another. The second member includes a notch portion having a cutting surface around at least a part thereof for allowing the rescue tool to be used to cut various substances such as seat belts, shoulder harnesses and sheet metal. The notch portion is positioned substantially parallel to the first member. The throat member extends between the first and second members substantially adjacent the forward end of the rescue tool. An anvil portion may be provided on the rearward end of the second member for allowing the rescue tool to be used to break various substances such as the windows of an automobile or the like.

8 Claims, 3 Drawing Figures

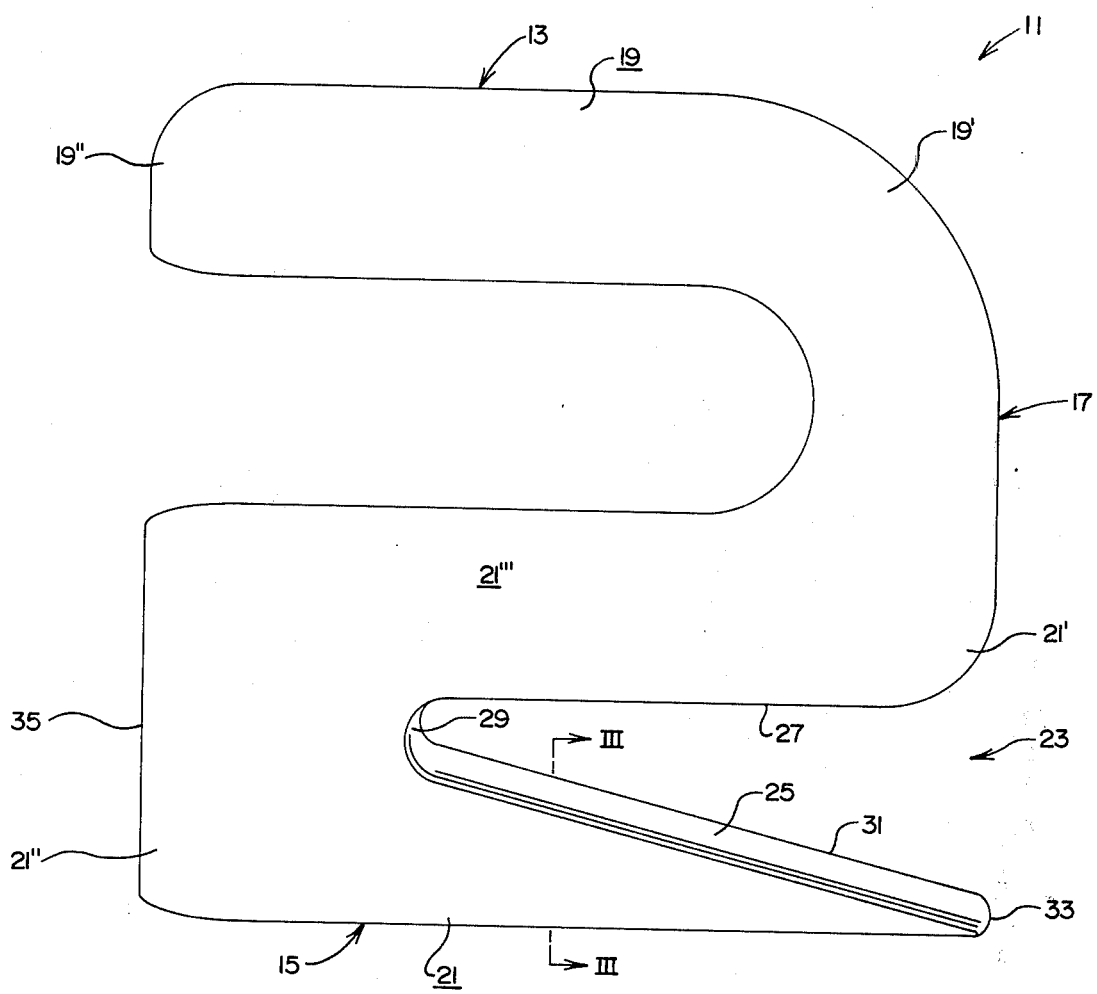
FIG. 1
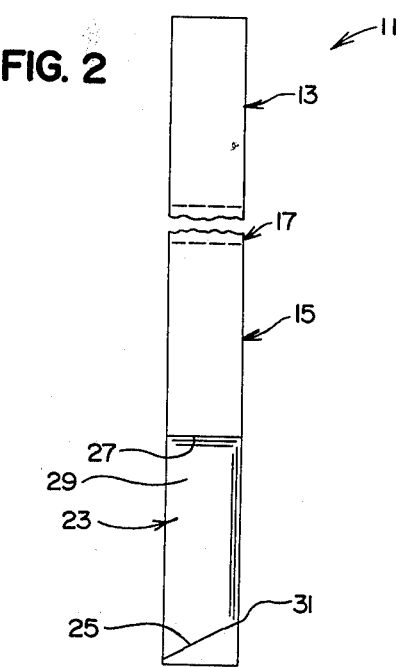
FIG. 2
FIG. 3

RESCUE TOOL MEANS

BACKGROUND OF THE INVENTION

1. Field of the Invention

This invention relates to devices for use during emergencies in attempting to free trapped victims from automobiles and the like after an accident or the like.

2. Description of the Prior Art

Heretofore, devices have been developed for aid in freeing victims of vehicular accidents and the like. See, for example, Bailey et al., U.S. Pat. No. 3,694,918 which discloses an apparatus for cutting sheet metal or the like under emergency conditions. The Bailey et al. apparatus includes a bar having a pry surface and a cutting blade on one end thereof and a cylinder reciprocally slidable on the other end thereof. In operation, the point of the cutting blade and the pry surface are rested on the sheet metal to be cut. The cylinder is then extended (i.e., slid away from the cutting blade and pry surface) and then forceably slid in the direction of the cutting blade so as to drive the point of the cutting blade through the sheet metal when the cylinder engages a corresponding stop on the bar. Cutting of the sheet metal is then accomplished by rocking the bar, using the pry surface as a fulcrum. The Bailey et al metal cutting apparatus does not disclose or suggest the present invention.

Applicant is aware of the following patents which may be of interest: Grogan, U.S. Pat. No. 1,045,396; Gartland, U.S. Pat. No. 1,163,230; Cullen, U.S. Pat. No. 2,230,376; Stoner, U.S. Pat. No. 2,802,259; Ziaylek, U.S. Pat. No. 3,705,430; and Eimmerman, U.S. Pat. No. Des. 153,776. None of these patents disclose or suggest the present invention.

SUMMARY OF THE INVENTION

The present invention is directed towards providing a rescue tool which is capable of cutting seat belt and shoulder harness material, breaking glass, severing sheet metal, and the like for particular use in freeing trapped victims from automobiles or the like.

One object of the present invention is to provide a rescue tool which has a sharp cutting edge that begins in a fine point for allowing it to enter small spaces.

Another object of the present invention is to provide a rescue tool which has a sharp cutting edge that ends in a radius.

Another object of the present invention is to provide a rescue tool which has a notch-like portion with a sharp cutting edge provided on at least one side thereof for allowing only material that enters the notch-like portion to be cut.

Another object of the present invention is to provide a rescue tool which has a notch-like cutting portion with one side of the notch-like cutting portion being angled away from the other side thereof so that the notch-like cutting portion will grip the material being cut tighter as the rescue tool is advanced over the material being cut.

Another object of the present invention is to provide a rescue tool which has a grip adapted to grasp the hand of the user of the rescue tool tighter as the rescue tool is pulled.

Another object of the present invention is to provide a rescue tool in which the hand of the user of the rescue tool is protected from the cutting edge thereof and from the material being cut.

Another object of the present invention is to provide a rescue tool which includes a substantially squared anvil portion to facilitate breaking glass and the like and to allow the rescue tool to be hammered upon to force the cutting edge thereof along the material being cut.

Another object of the present invention is to provide a rescue tool which includes a throat member between the handle and the cutting edge thereof for allowing a rope or the like to be attached to the rescue tool thereby allowing the rescue tool to be moved forward quickly.

Another object of the present invention is to provide a rescue tool which includes a grip member that is adapted to receive a pipe or the like for increasing the leverage obtainable with the rescue tool.

Another object of the present invention is to provide a rescue tool which is pocketable.

The rescue tool of the present invention includes a first member, a second member and a throat member integrally joining the first and second members one to the other. The first member includes a grip portion for allowing the rescue tool to be grasped. The second member includes a notch portion having a cutting edge thereon. The first and second members are integrally joined one to the other by the throat member with the grip portion of the first member extending a substantially equal distance with the second member and being substantially parallel with the notch portion of the second member.

BRIEF DESCRIPTION OF THE DRAWINGS

FIG. 1 is a side elevational view of the rescue tool means of the present invention.

FIG. 2 is a front elevational view of the rescue tool means of the present invention.

FIG. 3 is a sectional view of a portion of the rescue tool means of the present invention as taken on line III—III of FIG. 1.

DESCRIPTION OF THE PREFERRED EMBODIMENT

The rescue tool means 11 of the present invention is for use particularly in freeing trapped victims from automobiles or the like. The rescue tool means 11 includes, in general, a first member 13, a second member 15, and a throat member 17 fixedly joining the first and second members 13, 15 one to the other.

The first member 13 includes a grip portion 19 which includes a forward or first end 19' and a rearward or second end 19". The grip portion 19 is of a size and shape so as to allow the rescue tool means 11 to be easily grasped by the user of the rescue tool means 11.

The second member 15 includes a body portion 21 which has a forward or first end 21' and a rearward or second end 21". Additionally, the body portion 21 of the second member 15 has a notch portion 23 extending from the first end 21' toward the second end 21" of the body portion 21. The notch portion 23 includes a first wall 25, a second wall 27 and a connecting wall 29 joining the first and second walls 25, 27 together. The notch portion 23 additionally includes a cutting edge 31 along at least part of the walls of the notch portion 23. More specifically, the cutting edge 31 preferably extends along the first wall 25 and the connecting wall 29 (see FIG. 1). The end of the first wall 25 of the notch portion 23 preferably terminates in a point 33 at the first end 21' of the body member 21 on the end of the notch portion 23 opposite the connecting wall 29 (see FIG. 1). The connecting wall 29 of the notch portion 23 is preferably smoothly curved as shown in FIG. 1 to cause the inner end of the notch portion 23 to terminate in a radius. The first wall 25 of the notch portion 23 is preferably angled away from the second wall 27 thereof as shown in FIG. 1. That is, the angle starts at the connecting wall 29 of the notch portion and extends outwardly to the first end 21' of the body portion so that the space between the first and second walls 25, 27 is greater adjacent the first end 21' of the body portion 21 than at the connecting wall 29. The first and second walls 25, 27 preferably extend from the connecting wall 29 a substantially equal distance so that the second wall 27 extends substantially the entire length of the first wall 25 thereby preventing contact with the cutting edge 31 of the first wall 25 except by material entering the notch portion 23. The second member 15 also includes an anvil portion 35 located on the second end 21" of the body portion 21 substantially opposite the notch portion 23. The anvil portion 35 is preferably substantially squared to facilitate the use thereof in breaking glass and the like and to allow the anvil portion 35 to be easily hammered upon to force the rescue tool means 11 forward.

The first and second members 13, 15 are fixedly joined to one another by the throat member 17 with the first and second members 13, 15 extending substantially rearwardly of the throat member 17. The grip portion 19 of the first member 13 and the body portion 21 of the second member 15 preferably extend in substantially the same direction, with the longitudinal axis of the grip portion 19 and the body portion 21 substantially parallel with one another but spaced away from one another by the throat member 17.

The first member 13 and the second member 15 preferably extend from the throat member a substantially equal distance. That is, the first member 13 preferably extends along the entire length of the second member 15 as shown in FIG. 1.

The throat member 17 preferably extends between the first and second members 13, 15 substantially adjacent the first end 19' of the grip portion 19 and the first end 21' of the body portion 21 as shown in FIG. 1.

The rescue tool means 11 is preferably constructed entirely of a one-piece steel plate. More specifically, the rescue tool means 11 is preferably constructed by cutting a one-piece steel plate to have the shape substantially as shown in FIG. 1 and by filing or grinding the cutting edge 31 onto the first wall 25 and connecting wall 29 of the notch portion 23. The steel plate is preferably ⅜ inch (9.525 centimeters) thick. The rescue tool means 11 thus constructed will be relatively flat, thin and substantially rigid.

Many ways to use the rescue tool means 11 of the present invention will be apparent to those skilled in the art. For example, when a person is trapped inside an automobile and the doors of the automobile are unopenable, the rescue tool means 11 can be used to first break the windows or windshield of the automobile. To so break the windows or windshield of an automobile, the user of the rescue tool means 11 merely grasps the grip portion 19 of the tool means 11 and hits the window or windshield with the anvil portion 35 thereof. Next, any plastic safety binder means of the window or windshield means is cut by inserting the point 33 of the tool means 11 therethrough and pushing or pulling the rescue tool means 11 along the edges of the window or windshield thereby allowing substantially the entire window or windshield to be removed. If a larger opening is required to remove the person trapped within the automobile, the rescue tool means 11 can be used to cut away a portion of the sheet metal of the automobile body by first driving the point 33 thereof through the sheet metal. For example, a hammer can be used to drive the point 33 through the sheet metal of the automobile body by hitting the anvil portion 35 of the tool means 11. Next, the sheet metal can be cut by forcing the rescue tool means 11 along the sheet metal as by hammering the anvil portion 35, attaching a rope or the like to the throat member 17 of the tool means 11 and pulling the tool means 11 along the sheet metal, or by manually forcing the tool means 11 through the sheet metal. It should be noted that a pipe or the like can be inserted over the grip portion 19 of the tool means to give the user of the tool means 11 more leverage to cut through the sheet metal or the like. In either event, once access to the person trapped within the auto is gained, if the person is held within the automobile by a seat belt, shoulder harness or the like, and if the seat belt, shoulder harness or the like can't be readily removed, the rescue tool means 11 can be used to cut the seat belt, shoulder harness or the like by inserting the point 33 thereof between the seat belt, shoulder harness, etc., and the person's body. It should also be noted that the hand of the user of the rescue tool 11 is protected from the cutting edge 31 thereof and from the material being cut thereby when the user is grasping the grip portion 19 of the rescue tool 11 since a portion 21''' of the body portion 21 of the second member 15 of the rescue tool 11 is positioned between the grip portion 19 and the notch portion 3 of the second member 15. Other uses and methods of using the tool means 11 will be apparent to those skilled in the art.

As thus constructed and used, the present invention provides a pocketable cutting and breaking tool means for use in freeing trapped victims from automobiles and the like during emergency situations.

Although the invention has been described and illustrated with respect to a preferred embodiment thereof, it is not to be so limited since changes and modifications may be made therein which are within the full intended scope of the invention.

I claim:

1. A flat, one-piece rescue tool comprising a first member, a second member, and a throat member joining said first and second members one to the other; said first member including a grip portion for allowing said rescue tool to be grasped, said second member having a notch portion, said notch including a cutting edge, said first and second members extending rearwardly of said throat member, said second member including an anvil portion opposite said notch portion and positioned at a right angle to the longitudinal axis of said second member for allowing said tool to be hammered in a direction parallel to the longitudinal axis of said second member.

2. The rescue tool of claim 1 in which said notch portion of said second member includes a first wall, a second wall and a connecting wall joining said first and second walls, in which said cutting edge of said notch portion extends along said first wall and said connecting wall thereof, and in which said first and second walls extend from said connecting wall a equal distance.

3. The rescue tool of claim 2 in which the end of said first wall of said notch portion opposite said connecting wall thereof terminates in a point.

4. The rescue tool of claim 3 in which said connecting wall of said notch portion is smoothly curved.

5. The rescue tool of claim 4 in which said first wall of said notch portion is angled away from said second wall thereof, the angle starting at said connecting wall.

6. The rescue tool of claim 2 in which said throat member extends between said first and second members adjacent the forward end of said notch portion of said second member and in which said first and second members extend from said throat member a equal distance.

7. A flat, thin, rigid, one-piece cutting and breaking tool means for use in freeing trapped victims from automobiles or the like, said tool means comprising: a first member, a second member, and a throat member fixedly joining said first and second members on to the other; said first member including a grip portion for allowing said tool means to be grasped, said grip portion having a forward end, said second member including a forward end and having a notch portion extending rearwardly from said forward end, said notch portion including a first wall, a second wall and a connecting wall joining said first and second walls, said first and second walls extending the same direction from said connecting wall an equal distance; said notch portion including a cutting edge provided along the lengths of said first wall and said connecting wall, said first and second members being fixedly joined to one another by said throat member with said grip member of said first member positioned parallel to said notch portion of said second member, said throat member extending between said first and second members adjacent said forward ends of said grip portion of said first member and said second member, said first and second members extending rearwardly of said throat member an equal distance, said second member including an anvil portion opposite said forward end thereof and positioned at a right angle to the longitudinal axis of said second member for allowing said tool means to be hammered in a direction parallel to the longitudinal axis of said second member.

8. The tool means of claim 7 in which said tool means is constructed entirely of a one-piece metal plate.

* * * * *